March 10, 1936.  L. A. ELMER ET AL  2,033,277
FILM DRIVING MECHANISM FOR SOUND PICTURE SYSTEMS
Filed Jan. 7, 1932
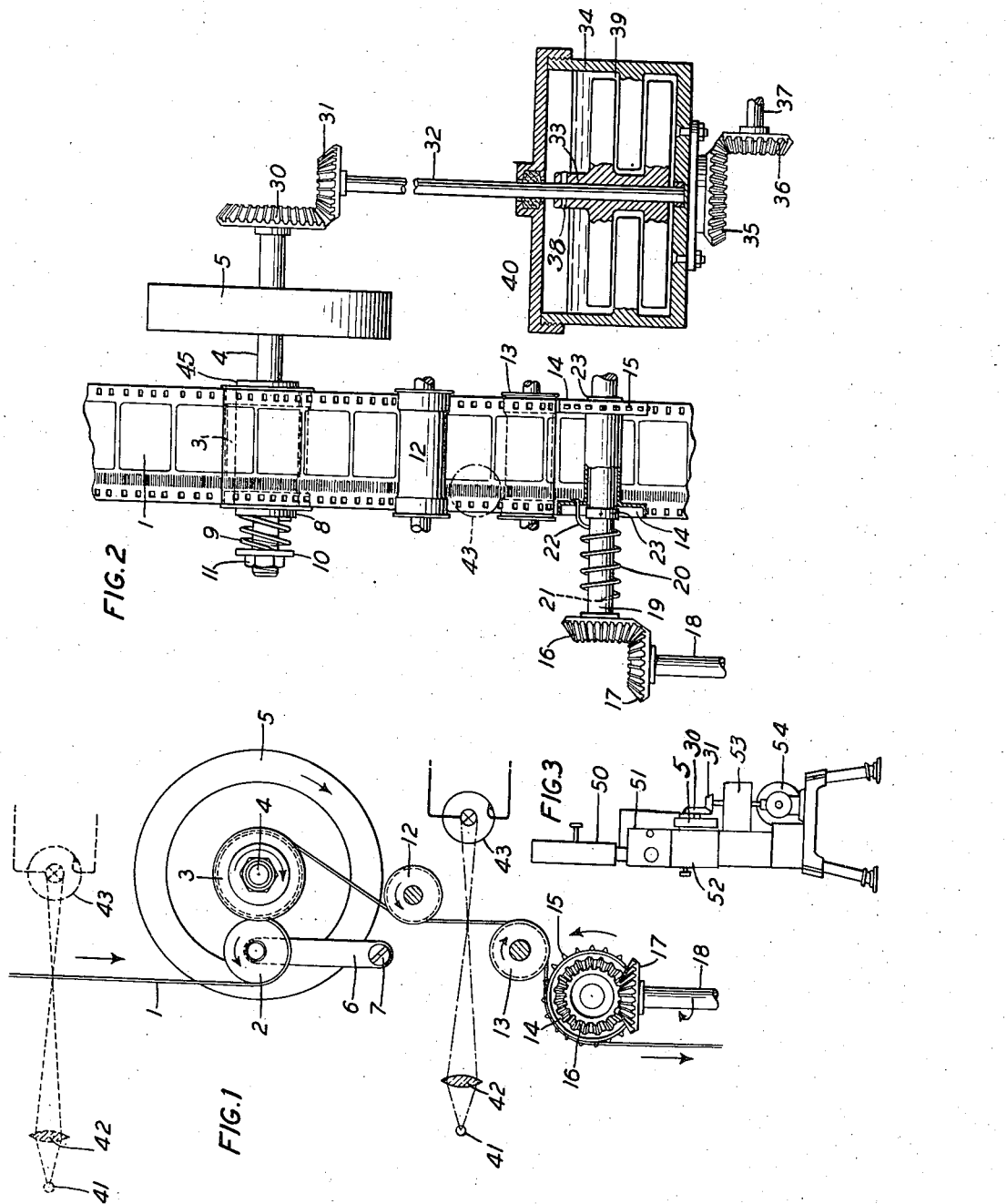
INVENTORS L.A.ELMER
H.W.MAC DOUGALL
BY
G.H.Heydt.
ATTORNEY Patented Mar. 10, 1936

2,033,277

UNITED STATES PATENT OFFICE 2,033,277

FILM DRIVING MECHANISM FOR SOUND PICTURE SYSTEMS

Lloyd A. Elmer, West Orange, and Harry W. MacDougall, East Orange, N. J., assignors to Bell Telephone Laboratories, Incorporated, New York, N. Y., a corporation of New York Application January 7, 1932, Serial No. 585,294

13 Claims. (Cl. 271—2.3)

This invention relates to sound picture apparatus and more particularly to a control mechanism for maintaining a film at constant velocity for sound translation.

A well known type of apparatus of this character in which sound and scene are synchronously recorded or reproduced involves driving the various mechanisms from a common source. This includes an apparatus for intermittently positioning a film before lenses for photographic exposure or projection and a cylinder or sprocket wheel for moving the film before sound translating apparatus. It is well established that the film must be moved at a uniform velocity for reproducing sound as well as for recording sound and that any velocity variations in either case that cause a pitch variation of over 0.3% will introduce noticeable sound distortions. In some cases a pitch variation of over 0.1% will introduce these sound distortions.

The intermittent motion, sprocket and rollers for moving the film past the picture lenses and point of sound translation are ordinarily driven by gears which are connected through shafts and other gears to an electric motor. The parts for this mechanical transmission apparently can not be produced and connected together in a manner to eliminate all irregularities of motion. Such irregularities have a tendency to produce velocity variations in the film driving apparatus. Another and very troublesome source of irregularities has been found to arise from variations in the film. A film is originally made to accurately fit the mechanism of the projector. During the life of a film shrinkage may alter the position of the perforations thus producing friction between sprocket wheel teeth and the edges of the perforations. This friction causes a noise which may be superimposed upon the sounds translated. This also produces a tendency toward unevenness of motion of the film. Irregularities in film load are also introduced by splices or the accumulation of dirt through film abrasion. Irregularities of the foregoing nature are difficult to eliminate where the film driving apparatus is directly connected by gears to the synchronized driving mechanism. This is particularly true in apparatus using a single means such as a sprocket and its associated mechanical filter and inertia element to control film velocity.

An object of this invention is therefore to provide a combination of mechanisms for moving a film at constant speed past sound translating apparatus in which a film feeding roller is driven by a floating or friction clutch at approximately film travel velocity and a sprocket wheel driven through a spring is arranged to accommodate the positional relation of the sprocket teeth to the film perforations and to exercise final regulation of the velocity of the roller as it withdraws the film from the roller and from the point of sound translation.

In accordance with one embodiment of the invention a band or film having a sound record thereon is moved to the sound translating apparatus by a friction roller. In view of the known characteristics of film strip, a friction roller is used instead of a sprocket to eliminate any possibility of noise due to misalignment of sprocket teeth with the film perforations. A flywheel is shown associated with the friction roller to assist in the elimination of velocity variations. This roller and flywheel are driven at approximately film travel velocity by a gear driven floating or friction clutch. The clutch may be of any type which will drive the roller and flywheel at a given velocity and permit the roller and flywheel to be driven at an increased velocity if film speed regulation is necessary. A clutch having an oil interposed between the driving and driven member or a turbine may be satisfactorily used between the driving gears and the film driving roller. The film or band is withdrawn from the friction roller and point of sound translation by a light-weight sprocket wheel which is gear driven through a yielding spring member. This sprocket is mounted upon a shaft having a suitable bearing and is connected to the shaft through the agency of a spring wound concentrically about the shaft. The spring driven sprocket performs two functions, one of which is to eliminate noise which ordinarily occurs due to the misalignment of sprocket teeth with the film perforations. In order that this may be accomplished the sprocket is permitted to rotate on the shaft bearing in either direction under the control of the spring. The sprocket teeth may thus be correctly aligned with the film perforation. This rotation although very slight is essential to quiet operation when a shrunken film is being used. The second function of the sprocket wheel is to positively regulate the speed of the roller and film.

As previously stated the film driving friction roller is driven by the floating or friction clutch at approximately the velocity that the film should move past the point of sound translation. If desired, the friction roller may be driven slightly less than film travel velocity in order to place a particular load upon the spring through which the sprocket is driven. There is inherently a backward movement or slip between the film and a friction roller. The sprocket therefore has a certain load placed thereon to compensate for this backward movement and to regulate the velocity of the film. If the roller is driven at approximately film travel velocity the load placed on the sprocket is very small. In regulating the velocity of the film, the sprocket exerts a pull on the film which rotates the friction roller, the flywheel and the member of the floating or friction clutch associated with the flywheel, slightly faster than they are normally driven by the gear driven member of this clutch. The speed of the clutch members is governed by the ratio of the driving gears. This ratio may be selected according to the load to be placed upon the spring driven speed regulating sprocket.

A friction or coasting clutch may be used between the flywheel shaft and the film driven roller operable when starting the projector to relieve the load on the film, until the flywheel and roller approach film travel speed.

Figs. 1 and 2 are side and front views of the film driving mechanism according to the invention;

Fig. 3 is a projector equipped with the mechanism of the invention.

The apparatus of Figs. 1 and 2 may be used with any type of machine in which a strip or band is required to move at unvarying velocity. The sound unit of a projector has been chosen as a suitable machine for disclosing the operation of this driving mechanism.

The mechanism of a projector in order to be synchronously operated is linked by gears and shafting to a common source of power which is disclosed as motor 54. A set of gears operated by the motor is represented by gear box 53. From this set of gears shafting is extended to the projector head 51 and sound translating unit 52. The film 1 is drawn from the delivery reel 50 and driven past the picture projecting apparatus in projector head 51. From this point the film is driven past the sound translating apparatus by the friction roller 3 and sprocket 14.

The mechanism of Figs. 1 and 2 is within or associated with the sound unit 52. The sound translating apparatus constituting light source 41, lens 42 and light sensitive cell 43 may be located in various positions along the line of travel of film 1, either above or below the friction driving roller 3. In certain types of mechanisms the sound translating apparatus may be associated directly with a friction roller having a light sensitive cell within its periphery. For the sake of simplicity the sound translating apparatus is disclosed between the friction roller 3 and sprocket 14.

In the arrangement disclosed herein separate shafts 37 and 18 are extended from the gear box 53 for driving the friction roller 3 and the sprocket 14, respectively. The periphery of the friction roller 3 is driven at approximately film travel velocity through the agency of the viscous clutch 40. The viscous clutch 40 is composed of two main members, an outer member 34 and an inner member 33. The outer member 34 is driven by the motor through shaft 37 and gears 35 and 36. The inner member 33 is driven by friction through the agency of the fluid 39 contained in the outer member 34. The outer member 34 is rotated at a sufficiently high velocity to rotate the inner member 33 by friction constantly at a particular velocity. Shaft 32 is connected by pin 38 to the inner clutch member 33 for rotating shaft 4 through the agency of gears 30 and 31. Flywheel 5 and roller 3 are mounted on shaft 4. The flywheel 5 provides mass or load to be driven by the friction clutch 40, which combination is used to eliminate velocity variations due to irregularities in the driving mechanism. The mass of flywheel 5 may be considered as small since very little mass is required to effect the elimination of velocity variations within the clutch member 40. The film 1 is thus driven at a uniform velocity by the friction roller 3. It is not, however, necessary that this uniform velocity be as great a velocity as the film should travel. The film travel velocity is positively controlled by the sprocket 14 and not by the friction roller 3. A guide roller 2 is associated with the friction driving roller 3 to maintain the film in close contact with the driving roller 3. The guide roller 2 is supported by spring 6 which is fastened in the sound unit by screw 7. Two guide rollers 12 and 13 are shown for guiding the film past the point of sound translation.

The periphery of sprocket 14 is driven at film travel velocity by shaft 18 and gears 16 and 17. The sprocket 14 is mounted on bearings 23 which are pinned to the shaft 19. This sprocket is rotated under the control of spring 20 which is connected at one end to shaft 19 by inserting the spring in hole 21 and at the other end to sprocket 14 by inserting the spring in hole 22. This arrangement permits the sprocket to vary its position on the bearing depending upon the load placed upon the sprocket. It also permits a slight variation in either direction of rotation to accommodate the positional relation of the sprocket teeth to the perforations of the film. When a film has become warped or has been spliced the perforations become slightly out of alignment and therefore are not spaced as accurately as the sprocket teeth. Any misalignment of the film perforations with the sprocket teeth results in a scraping noise as the edges of the perforations bind against the sprocket teeth. This noise is superimposed upon translated sounds. The misalignment of perforations with the sprocket teeth also causes an irregularity of motion of the film. The slight movement of the sprocket in either direction of rotation under the control of the resilient spring thus prevents both noise and irregularity of film movement.

As previously stated, the friction roller 3 is driven at approximately film travel velocity through the agency of the friction clutch 40 associated with gears 35 and 36. The film is thus driven by the roller at approximately the velocity it should travel for sound translation. If, however, the film were driven solely by this roller there would be a slight difference between the velocity of the film and the velocity of the roller due to inherent creeping of the film on the roller surface. In order to compensate for this creeping backward travel of the film, the sprocket 14 is used to positively regulate the velocity of film travel. The sprocket thus has a load placed thereon to maintain the movement of the film at a fixed constant velocity. This sprocket by withdrawing the film from the roller at constant velocity exerts a force on roller 3 through the film which increases the velocity of the roller and also increases the velocity of the flywheel 5 and the inner member 33 of the clutch 40. It will be remembered that the outer member 34 of the clutch 40 rotates more rapidly than the inner member to maintain the inner member at a particular velocity. It is therefore not necessary to exert a great force through the film on the friction roller 3 to slightly increase the velocity of the flywheel 5 and the clutch member 33. Under certain conditions a load may be required to regulate the tension of spring 20 greater than the load placed on sprocket 14 by the creeping or backward travel between the film at the friction roller 3. This load on sprocket 14 may be increased by decreasing the velocity of clutch member 33 which would decrease the velocity of the flywheel 5 and friction roller 3 below film travel velocity. Under this condition it is necessary for the sprocket to constantly exert a greater force on roller 3 through the film 1 for increasing the velocity of roller 3, flywheel 5 and clutch member 33.

When starting the mechanism of the projector, it is obvious that the sprocket wheel drives the film at a higher velocity than it is driven by the friction roller 3 since the sprocket is directly driven by a gear and the roller 3 is driven through a floating or friction clutch. In order that a strain may not be exerted upon the film the roller 3 is arranged to temporarily rotate upon the shaft 4 under the control of a slipping or coasting clutch. This slipping clutch is disclosed as a friction disc 8 maintained in position against the roller 3 by spring 9, washer 10 and nut 11. Thrust collar 45 is rigidly connected to shaft 4 to maintain the roller 3 in position against the axial thrust of spring 9. Any arrangement may, however, be used which will permit the roller 3 to temporarily rotate on shaft 4 until the clutch member 33 has been brought up to driving speed. After the clutch member 33 has been brought up to driving speed, the friction roller 3 no longer rotates on shaft 4 but rotates therewith at the same velocity as flywheel 5 and clutch member 33. This provision is not entirely necessary since under ordinary circumstances the film is strong enough to rotate the flywheel and clutch member 33 under the control of the sprocket 14.

The friction clutch 40 may be of any type which permits slippage between the driving and driven member to facilitate speed regulation under the control of a sprocket driven through the spring 20. In some cases one member of the friction clutch such as 33 may be connected directly to shaft 4, the driving member of the clutch such as 34 being connected to gear 35 and driven by gear 36 as shown. In an arrangement of this character gears 30 and 31 are not used between clutch 40 and the roller 3. In consequence of this no flywheel is required on shaft 4 since irregularities due to velocity variations in the driving mechanism may be effectively absorbed by the friction clutch 40. The gears 30 and 31 may also be eliminated by the use of one or more belts driven by members 33 of clutch 40 for driving roller 3 through the agency of pulleys. The latter arrangement would also eliminate the necessity of mounting flywheel 5 on shaft 4. As indicated in the foregoing, many departures in structure from the one disclosed may be made without departing from the spirit or scope of the invention.

What is claimed is:

1. Film driving mechanism comprising a film feeding friction roller, means independent of said film for continuously driving said roller at approximately film travel velocity, a sprocket and a member for said sprocket arranged to yield for a compensating shift of the sprocket teeth to register with successive film perforations and means for driving said member and sprocket at an unvarying speed for regulating the velocity of said film and for maintaining the speed of rotation of said friction roller at said film travel velocity.

2. Film driving mechanism comprising a film feeding friction roller, a driven clutch for continuously driving said roller at approximately film travel velocity, a sprocket and a driving member for said sprocket arranged to yield for a compensating shift of the sprocket teeth to register with successive film perforations for driving the film at unvarying velocity and for regulating the velocity of said friction roller.

3. Film driving mechanism comprising a film feeding friction roller, a driven clutch for continuously driving said roller at approximately film travel velocity, one member of said clutch being free to be driven at an increased velocity by a force exerted on said roller, a sprocket and a driving member for said sprocket arranged to yield for a compensating shift of the sprocket teeth to register with successive film perforations for driving the film at unvarying velocity and exercising final regulation of the velocity of said friction roller by exerting force thereon through said film.

4. Film driving mechanism comprising a film feeding friction roller, a driven clutch for continuously driving said roller at approximately film travel velocity and a sprocket driven through a spring arranged to yield to accommodate the positional relation of the sprocket teeth to the film perforations for driving the film at unvarying velocity and for exercising final regulation of the velocity of said friction roller.

5. Driving mechanism for maintaining a band of inconsiderable mass at constant velocity comprising a friction roller for continuously driving said band, a clutch for driving said roller at a selected velocity, means for driving the members of said clutch for maintaining said selected velocity, a second driving means comprising a sprocket and a driving member for said sprocket arranged to yield for a compensating shift of the sprocket teeth to register with successive film perforations for driving said band at constant fixed uniform velocity and for maintaining said roller and one member of said clutch at the velocity of said band and second driving means.

6. Driving mechanism for maintaining a band of inconsiderable mass at constant velocity comprising a friction roller for driving said band, a clutch for continuously driving said roller at a selected velocity, means for driving the members of said clutch for transmitting varying power to the driving member of said clutch and the roller under varying load conditions, and a second driving means for driving said band at a constant fixed velocity including a sprocket for exercising final regulation of the velocity of said friction roller by exerting force thereon through said film and a driving member for said sprocket arranged to yield for a compensating shift of the sprocket teeth to register with successive film perforations for driving the film at unvarying velocity.

7. Driving mechanism for maintaining a band of inconsiderable mass at constant velocity comprising a friction roller for driving said band, a clutch for driving said roller having one member driven by a second member through an intermediate agency which permits said members to rotate at different velocities, means for driving said clutch members at such velocities as to maintain the rotation of said roller at a selected velocity, a sprocket driven through a spring for driving said band at a fixed constant velocity and thereby maintaining said roller and one member of said clutch at the velocity of said band and sprocket.

8. In sound picture apparatus adapted to feed a band of inconsiderable mass provided with perforations for sprocket teeth, a friction feed roller for feeding said band past sound translating apparatus, means including a flywheel and a clutch for maintaining said roller uniformly at approximately film travel velocity, said clutch having a driven member and a driving member for continuously driving said roller under varying load conditions, and means to withdraw said band from the point of sound translation including a sprocket driven through a spring arranged to yield to accommodate the positional relation of the sprocket teeth to the film perforations for driving the film at unvarying velocity and for exerting final regulation of the velocity of said friction roller.

9. In sound picture apparatus adapted to feed a band of inconsiderable mass provided with perforations for sprocket teeth, a friction feed roller for feeding said band past sound translating apparatus, means including a flywheel and a fluid clutch for maintaining said roller at a constant velocity, said clutch having a driven member and a driving member for continuously driving said roller, means to withdraw said band from the point of sound translation at a constant velocity comprising a lightweight sprocket wheel driven by a spring arranged to yield to accommodate the positional relation of the sprocket wheel teeth to the perforations in said band responsive to positional changes in the band due to variations therein, and means for rotating the driven member of said clutch at a high velocity for transmitting varying power to the driving member and roller under varying load conditions.

10. In sound picture apparatus adapted to feed a band of inconsiderable mass provided with perforations for sprocket teeth, a friction feed roller for feeding said band past sound translating apparatus, means including a flywheel and a fluid clutch for maintaining said roller at a constant velocity, said clutch having a driven member and a driving member for continuously driving said roller, means to withdraw said band from the point of sound translation at a constant velocity comprising a lightweight sprocket movable on a shaft bearing and driven by a flexible spring arranged to yield for variably positioning the sprocket on said shaft bearing to accommodate imperfectly spaced sprocket teeth perforations in said band, and means for rotating the driven member of said clutch at a high velocity for transmitting varying power to the driving member and roller under varying load conditions.

11. Film driving mechanism for maintaining a band of inconsiderable mass at constant velocity comprising a friction roller for feeding said band, a clutch having a driven member and a driving member for continuously driving said roller, a second driving means for driving said band at a constant fixed velocity, thereby changing the load of said roller on said clutch, said second driving means including a sprocket and a driving member for said sprocket arranged to yield for a compensating shift of the sprocket teeth to register with successive film perforations and means for rotating the driven member of said clutch at a high velocity for transmitting varying power to the driving member and roller under varying load conditions.

12. Film driving mechanism comprising a film feeding friction roller, a driven clutch for continuously driving said roller, a second driving means for driving said band at a constant fixed velocity thereby maintaining said roller at the velocity of said band, said second driving means including a sprocket and a driving member for said sprocket arranged to yield for a compensating shift of the sprocket teeth to register with successive film perforations and means to move one member of the clutch at a higher velocity than said second member to combine its driving action with that of said second driving means to diminish the load on said second driving means.

13. Film driving mechanism for maintaining a band of inconsiderable mass at constant velocity comprising a friction roller for feeding said band, a clutch having a viscous fluid between the driven and driving members for driving said roller, a second driving means for driving said band at a constant fixed velocity thereby maintaining said roller at the velocity of said band, said second driving means including a sprocket and a driving member for said sprocket arranged to yield for a compensating shift of the sprocket teeth to register with successive film perforations and means for rotating the driven member of said clutch at a higher velocity than the driving member for continuously delivering driving power to said roller in combination with said second driving means.

LLOYD A. ELMER.
HARRY W. MacDOUGALL.